United States Patent
Kawakami

(10) Patent No.: US 6,643,150 B2
(45) Date of Patent: Nov. 4, 2003

(54) CONTROL DEVICE FOR POWER CONVERTER

(75) Inventor: Kazuto Kawakami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 10/090,001

(22) Filed: Mar. 5, 2002

(65) Prior Publication Data

US 2002/0131285 A1 Sep. 19, 2002

(30) Foreign Application Priority Data

Mar. 13, 2001 (JP) ........................................ 2001-069633

(51) Int. Cl.$^7$ ................................................ H02M 1/12
(52) U.S. Cl. .......................................... 363/41; 363/132
(58) Field of Search .............................. 363/39, 40, 41, 363/125, 131, 132

(56) References Cited

U.S. PATENT DOCUMENTS

| 5,077,652 A | * 12/1991 | Faley .......................... 363/97 |
| 5,361,196 A | * 11/1994 | Tanamachi et al. ............ 363/41 |
| 5,465,011 A | * 11/1995 | Miller et al. ................... 307/64 |
| 5,602,464 A | * 2/1997 | Linkowsky et al. ......... 323/272 |
| 5,650,708 A | * 7/1997 | Sawada et al. .............. 318/801 |
| 6,069,802 A | * 5/2000 | Priegnitz .................. 363/21.06 |
| 6,154,379 A | * 11/2000 | Okita ........................... 363/40 |
| 6,404,655 B1 | * 6/2002 | Welches ....................... 363/41 |

FOREIGN PATENT DOCUMENTS

JP        6-14590        1/1994

* cited by examiner

Primary Examiner—Adole D. Berhane
(74) Attorney, Agent, or Firm—Foley & Lardner

(57) ABSTRACT

The IGBT drive signal to a power converter comprising power semiconductor elements, such as IGBT, is supplied by a PWM controller which performs pulse width modulation of voltage references. A DC offset voltage Vd is generated by a DC offset generator in accordance with the output frequency f and output phase θ, and this voltage Vd and the voltage references are added together by adders 22–24, and supplied to the PWM controller to form IGBT drive signals. Thereby, it is possible to reduce the amount of loss generated by the power semiconductor elements used in the control device of a power converter for converting DC voltage to AC voltage, or AC voltage to DC voltage.

7 Claims, 11 Drawing Sheets

CONTROL DEVICE FOR POWER CONVERTER

CROSS REFERENCE TO RELATED APPLICATION

This application claims benefit of priority to Japanese Application No. JP2001-69633 filed Mar. 13, 2001, the entire content of which is incorporated by reference herein.

BACKGROUND OF THE INVENTION

1. Field of the Invention

The present invention relates to a power converter for converting DC power into AC power or AC power into DC power, and more particularly, to a control device for a power converter which reduces loss generated by power semiconductor elements used in the power converter (loss through heat energy).

2. Description of the Related Art

FIG. 1A shows a composition of a conventional power converter. Members 1–6 are insulated gate-type bipolar transistors (hereinafter, "IGBT"), flywheel diodes (hereinafter, "FWD") 7–12 being connected respectively inversely in parallel with the IGBT elements 1–6, to form a three-phase bridge circuit. 13 denotes a DC power supply, and 14 denotes the load of the power converter.

FIG. 1B shows a pulse width modulation (PWM) controller, which performs pulse width modulation of U-phase–W phase voltage references output by a control circuit (not illustrated) to convert same respectively into drive signals for the aforementioned IGBT 1–6.

The description here relates to IGBT, but it is also possible to use other power semiconductor elements, such as GTO (Gate Turn On Transistor), MOSFET (Metal Oxide Semiconductor Field Electric Transistor), bipolar transistors, or the like.

FIG. 2A illustrates the U-phase which is one phase of the three-phase bridge circuit, and FIG. 2B shows the composition of one phase of the PWM controller 15. The V-phase and W-phase also have a similar composition. In FIG. 2B, numeral 16 denotes a PWM carrier signal generator which generates a PWM carrier signal, and signal from the PWM carrier signal generator 16 is compared with the voltage reference signal by a PWM comparator 17.

The signal from the PWM comparator 17 is inverted by a signal inverter 18 to generate the signal for IGBT 2. Numerals 19 and 20 are respective dead-time generators for preventing a simultaneous 'on' state of the IGBT 1 and IGBT 2, due to the switching delay time of the IGBT 1 and IGBT 2.

FIG. 3 is a timing chart showing an example of the operations performed when a current iu flows in the direction of the arrow in FIG. 2A, against a time axis.

Hereinafter, the values iu, iv, iw, Vu, Vv, Vw, Eu, Ev, Ew, and the like, are used, and these are all vector values. For the sake of convenience, they are stated as scalar quantities.

In FIG. 3, the frequency of the voltage reference is zero, in other words, when the DC current is on, the voltage reference is positive, and if the current is flowing in the direction of iu, then current will only flow in IGBT 1 and FWD 8. Therefore, in this case, considering the U-phase alone, a loss due to the flow of current and switching is generated in IGBT 1 and FWD 8, whereas virtually no loss is generated in IGBT 2 and FWD 7, since no current flows therein.

For example, assuming that current iu=1, and taking the loss of the IGBT 1 per turn-on switching operation as Eon, the loss of the IGBT 1 per turn-off switching operation, as Eoff, the on voltage, as VCE, the time ratio that IGBT 1 is on (hereinafter, called "duty"), as a (where $0 \leq a \leq 1$), the loss of the FWD 8 per switching operation, as Edsw, the on voltage, as VF, and the frequency of the PWM carrier as fPWM, then the loss PT of the IGBT 1 and the loss PD of the FWD 8 are given by the following equations.

$$PT = (Eon + Eoff) \times fPWM + VCE \times 1 \times a$$

$$PD = Edsw \times fPWM + VF \times 1 \times (1-a)$$

The aforementioned losses, Eon, Eoff, Edsw, and the on voltages VCE, VF vary respectively with the current I.

If the load 14 is an electromotive device, then generally the resistance is low and the respective reference voltages are virtually zero, and consequently, the respective power semiconductor elements will be on for approximately ½ of the PWM cycle, and will be off for the remaining approximately ½ of the cycle (a≈0.5).

Furthermore, generally, the switching losses Eon, Eoff of the IGBT are large compared to the switching loss Edsw of the FWD, so the loss PT of the IGBT will be greater than the loss PD of the FWD. In other words, the loss of IGBT 1 will be greater than the loss of the FWD 8.

Consequently, the IGBT 1 generates a large amount of heat, and if the temperature rise caused by this heat generation is excessive, then there is a risk of damage to the IGBT 1, and hence problems arise in that when passing DC current, either the current of the IGBT 1 must be reduced, or the size of the cooling device (not illustrated) of the IGBT 1 must be increased in order to deal with the generated heat. If the current is reduced, then the current capacity of the device cannot be exploited satisfactorily.

Even if the voltage references are AC, at low frequencies, they can be regarded effectively as DC voltages, and hence similar problems to the foregoing arise.

SUMMARY OF THE INVENTION

Accordingly, one object of the present invention is to provide a novel control device for a power converter, whereby loss in power semiconductor elements can be reduced when passing DC current or low-frequency AC current.

In order to achieve the aforementioned object, the present invention is composed as follows. Namely, in a control device for a power converter constituted by power semiconductor elements for converting DC voltage to AC voltage, and AC voltage to DC voltage, by means of pulse width modulation, the loss of the aforementioned lower semiconductor elements constituting the power converter is reduced by adding a DC offset voltage to the AC voltage references, when the frequency of said AC voltage references is at of below a prescribed value.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 4:
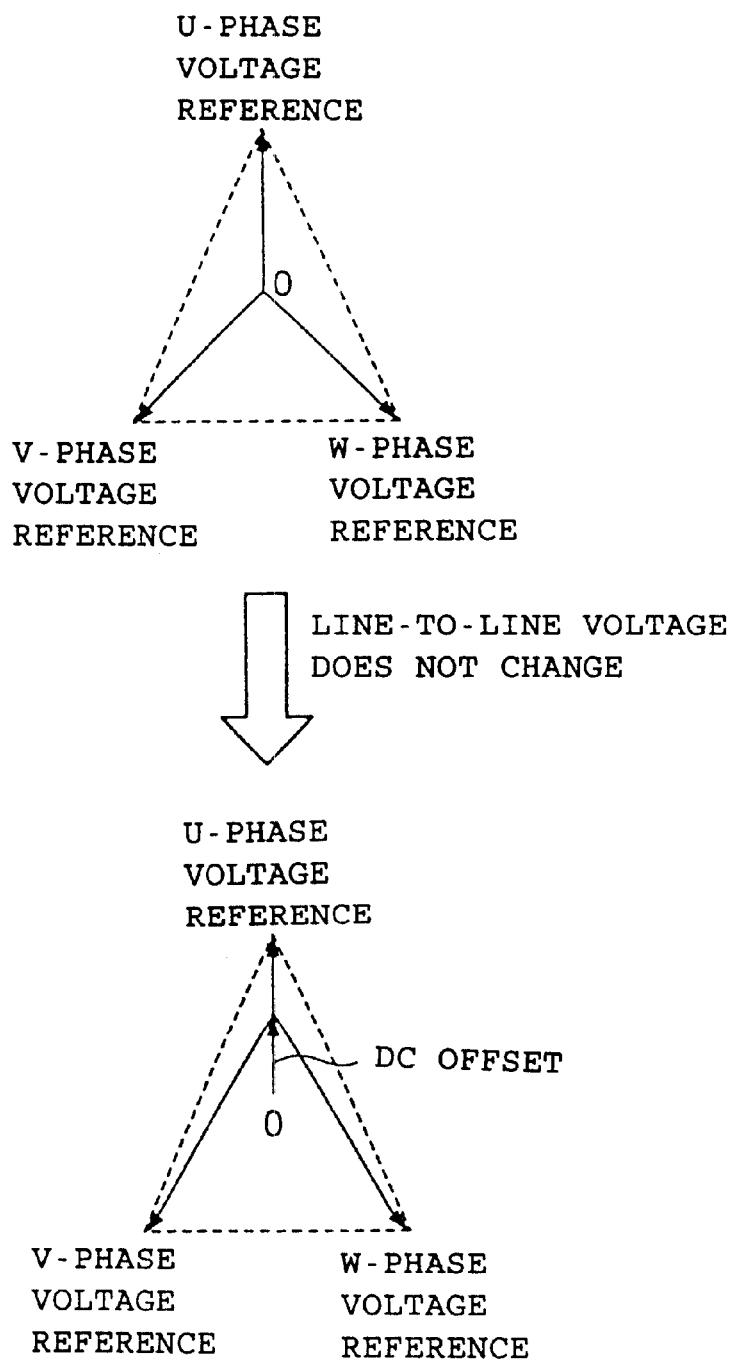
FIG. 4 shows an explanatory diagram of the output voltage vectors of a control device for a power converter according to the present invention.

Referring now to the drawings, wherein like reference numerals designate identical or corresponding parts throughout the several views, and more particularly to FIG. 4 thereof, one embodiment of the present invention will be described.

Below, before describing an embodiment of the present invention, an overview of the present invention is described with reference to FIG. 4 and FIG. 5. In the present invention, the duty is varied whilst maintaining uniform three-phase line-to-line voltages (so-called line voltage), by adding a DC component to a three-phase voltage reference, so as to reduce the loss of semiconductor elements having the highest loss.

In other words, taking the voltage references in each phase as Vu, Vv and Vw, the DC offset voltage Vd is added thereto to give $Eu=Vu+Vd$ $Ev=Vv+Vd$ $Ew=Vw+Vd$ Here, the line-to-line voltages (line voltage) will be $Vuv=Eu-Ev=Vu-Vv$ $Vvw=Ev-Ew=Vv-Vw$ $Vwu=Ew-Eu=Vw-Vu$ and hence the line-to-line voltages will not change, before and after addition of the DC offset voltage Vd. This is depicted by a voltage vector diagram in FIG. 4. More specifically, in FIG. 4, the U-phase voltage reference can be reduced by varying the line-to-line voltage, and hence the loss generated in the U-phase can be reduced.

Figure 5:
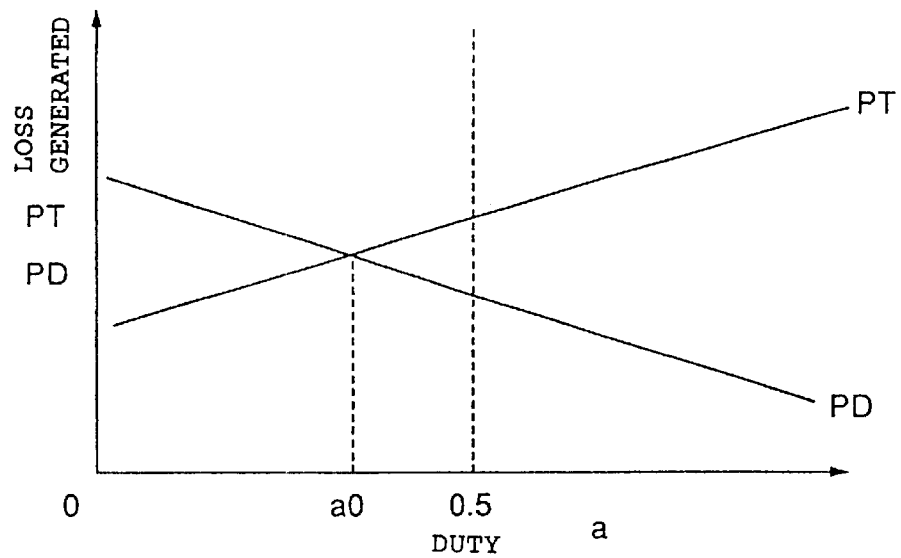
FIG. 5 shows an illustration of change in the loss generated by power semiconductor elements.

On the other hand, FIG. 5 shows an example of the characteristics of the on time ratio, in the other words, the "duty" of an IGBT having uniform current I, the loss PT of the IGBT, and the loss PD of the FWD. Since the duty a can be varied by means of the DC offset voltage Vd, then, for example, if a=a0, then PT=PD, and hence the losses generated by the IGBT and FWD can be made equal. In this case, since the respective line-to-line voltages do not change, there is no effect on the load.

Moreover, since the loss of the IGBT 1 per turn-on switching operation, Eon, the loss of the IGBT 1 per turn-off switching operation, Eoff, the loss of the FWD per switching operation, Edsw, the on voltage of the IGBT, VCE, and the on voltage of the FWD, VF, vary with the current I, the added DC offset voltage is changed in accordance with the polarity and amplitude of the current.

Therefore, a characteristic feature of the present invention is that, in the DC operating range or the low-frequency AC operating range, the DC offset voltage is added to the three-phase voltage references, in such a manner that the heat generated by the power semiconductor elements is reduced.

Figure 1:
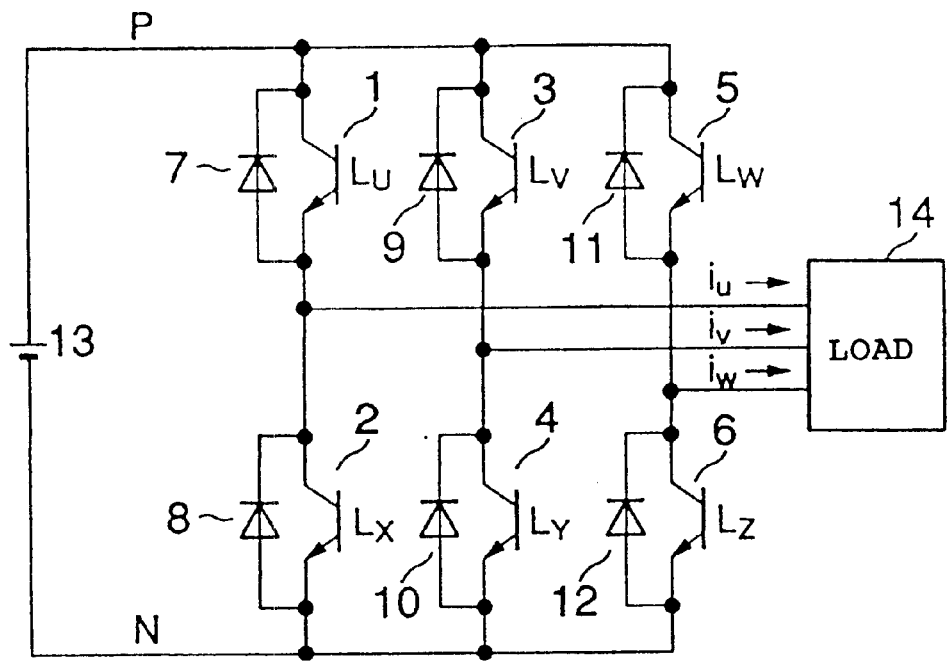
FIG. 1A and FIG. 1B show a compositional diagram of a control device for a conventional power converter, and a diagram of a PWM controller for the same.
Figure 1:
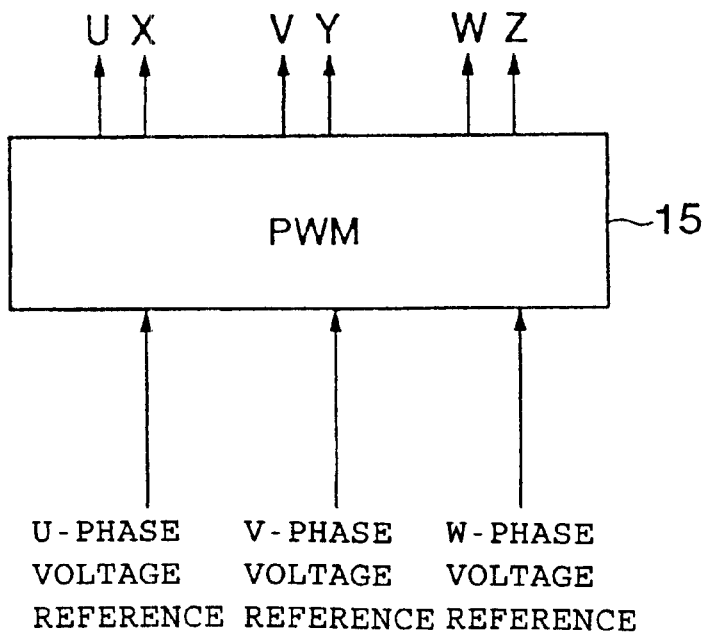
Figure 2:
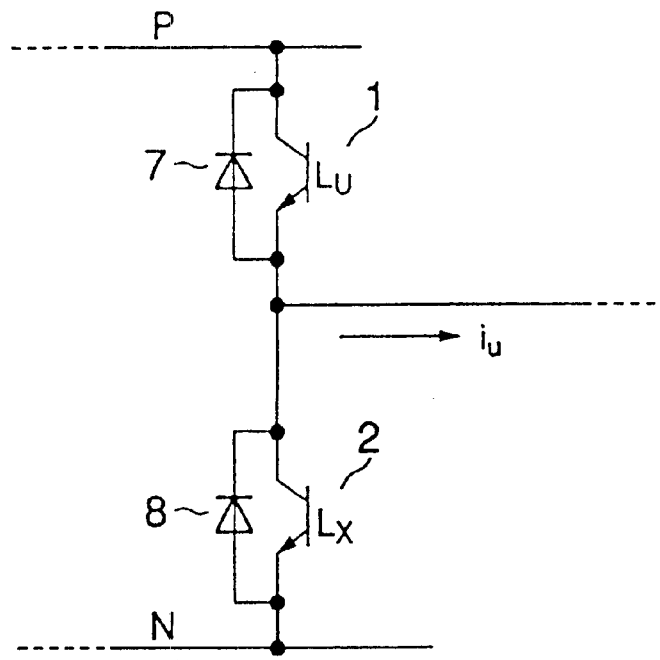
FIG. 2A and FIG. 2B show a single-phase circuit diagram of a three-phase bridge circuit, and a PWM controller.
Figure 2:
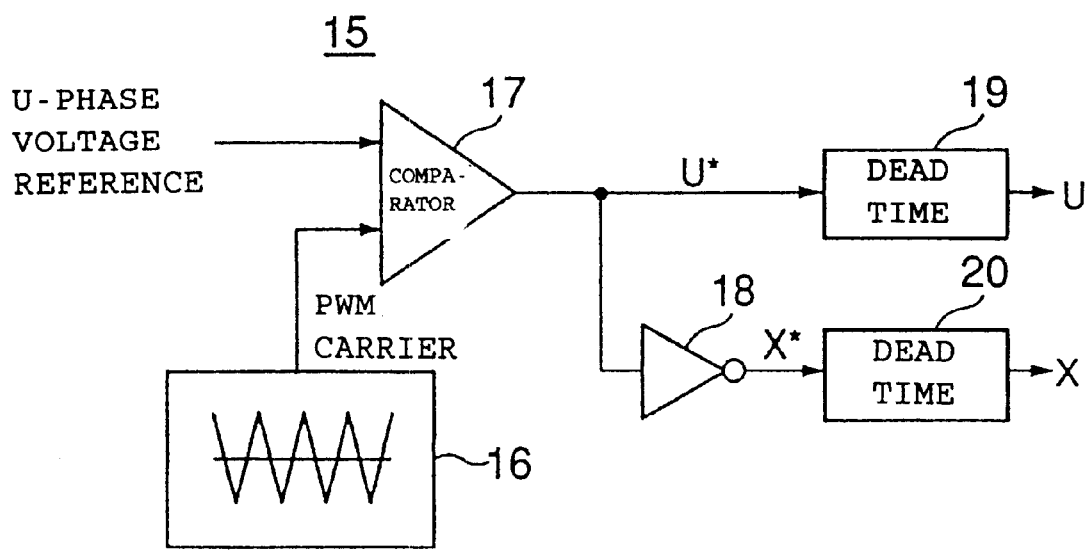
Figure 6:
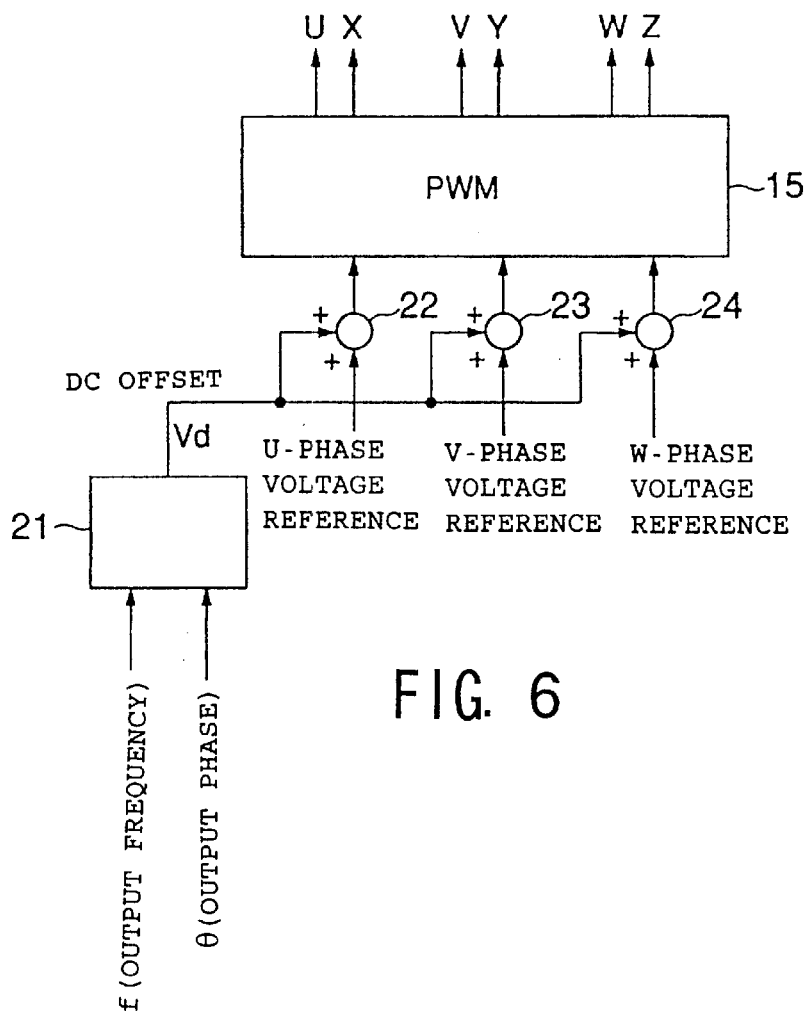
FIG. 6 shows a compositional diagram of an embodiment of a control device for a power converter according to the present invention.

Below, a concrete embodiment of the present invention is described with reference to FIG. 6. The power converter constituted by a three-phase bridge circuit has a similar composition to the prior art composition illustrated in FIG. 1, and uses semiconductor elements comprising IGBT devices of respective phases, and FWD devices connected inversely in parallel with these IGBT. Drive signals for the IGBT are supplied by a PWM controller 15 which performs pulse width modulation of U-phase, V-phase and W-phase voltage references output by a control circuit.

A DC offset generator 21 generates a DC offset voltage Vd according to the output frequency (frequency of the voltage references) f, and the output phase θ, and this DC offset voltage Vd is added to the voltage reference of each phase by adders 22–24, and input to the PWM controller 15.

FIG. 7A and FIG. 7B show an example and explanatory diagram of a DC offset generator 21. A DC offset voltage corresponding to the output phase θ is generated by a function generator 25, and the DC offset voltage is added to the voltage reference of each phase when the output frequency f is at or below a prescribed value f0 according to a frequency decider 26.

Figure 8:
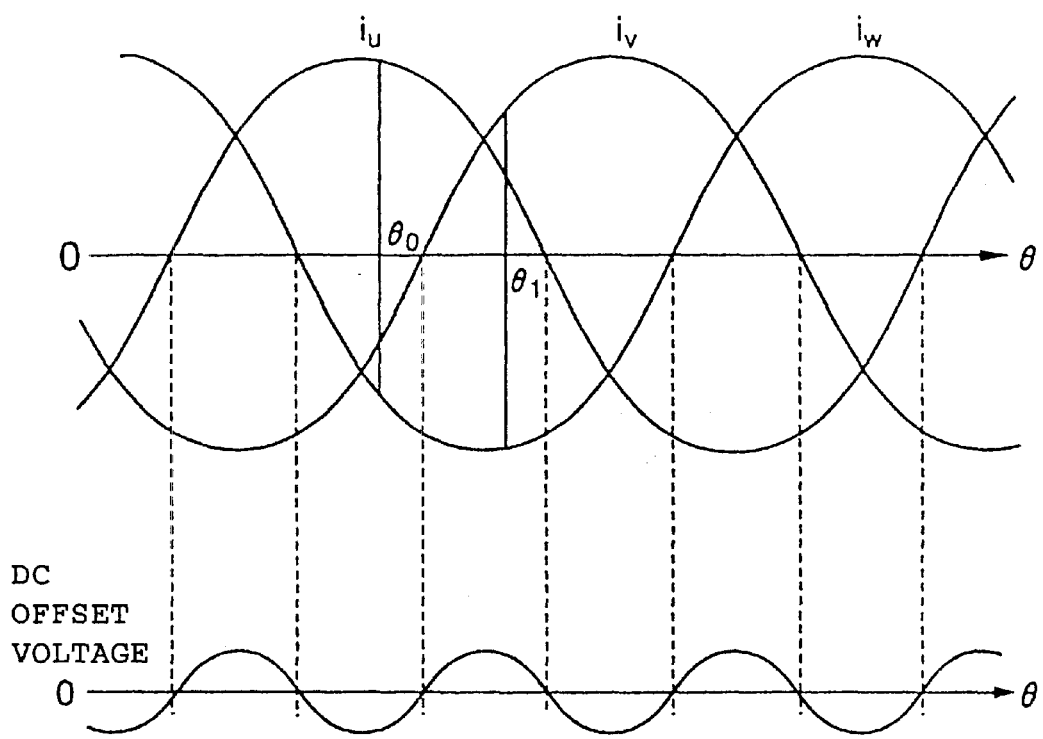
FIG. 8 is an illustrative diagram showing the basic operation of the present invention.

In this case, as shown in FIG. 8, the amplitude of the current in each phase varies according to the output phase θ, but at θ=θ0, for example, the current iu is a maximum and the U-phase loss of the power semiconductor elements is large compared to the other phases, so the DC offset voltage is determined by concentrating on the U-phase loss of the power semiconductor elements, whereas at θ=θ1, the absolute value of current iw is a maximum and the W-phase loss of the power semiconductor elements is large compared to the other phases, so the DC offset voltage should be determined by concentrating on the W-phase power semiconductor elements.

It is possible to determine the DC offset voltage in such a manner that that the loss of the power semiconductor element generating the greatest loss, of the IGBT 1–6 and FWD 7–12, is reduced the most, or alternatively, it is possible to set the DC offset voltage in such a manner that the temperature rise of the power semiconductor element having the greatest temperature rise is reduced the most, taking into consideration the thermal resistance of the cooler which cools the power semiconductor elements.

According to the aforementioned embodiment of the present invention, by setting a DC offset voltage when the frequency of the voltage references is low or when the voltage reference is DC, it is possible to reduce the loss of the power semiconductor elements.

A further embodiment of the present invention is illustrated in FIG. 9A and FIG. 9B. FIG. 9A is a further composition of a DC offset generator 21. Numeral 27 is a gain generator for generating a gain in accordance with the output frequency f, the respective outputs a function generator 25 and gain generator 27 being multiplied by a multiplier 28, and supplied to a PWM controller 15 as an offset voltage Vd.

According to this embodiment, the DC offset voltage diminishes as the frequency of the voltage reference increases, as illustrated by the characteristics diagram shown in FIG. 9B. It is also possible to reduce the loss of the power semiconductor elements by this composition.

Figure 3:
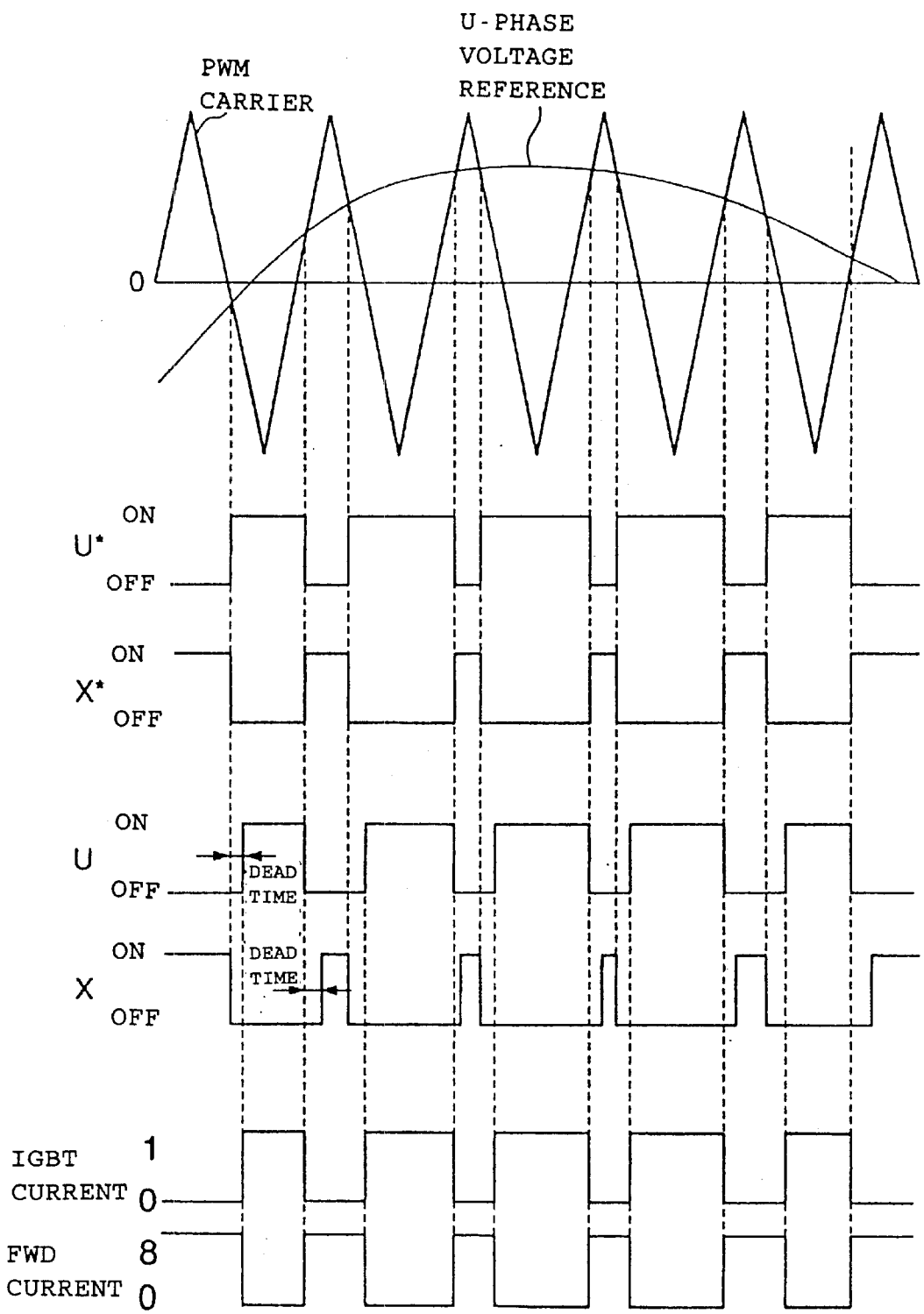
FIG. 3 shows an illustrative diagram of the basic operation of a conventional control device for a power converter.
Figure 10:
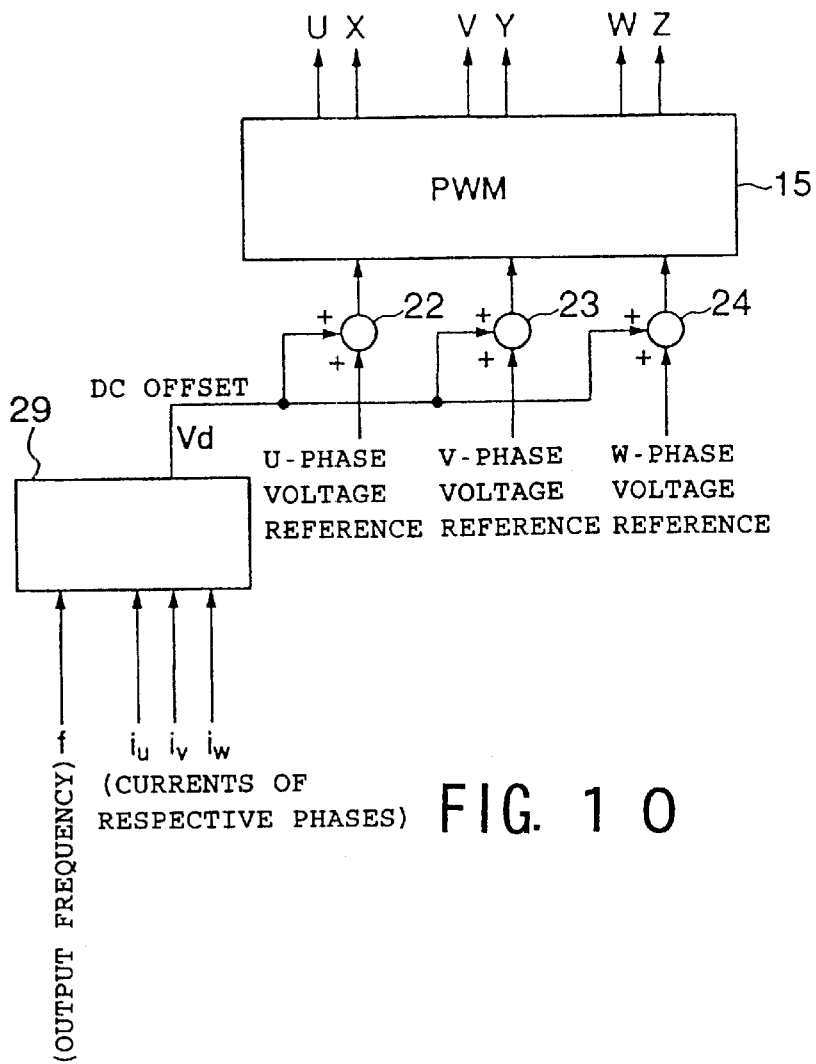
FIG. 10 is a compositional diagram of a further embodiment of the present invention.
Figure 11:
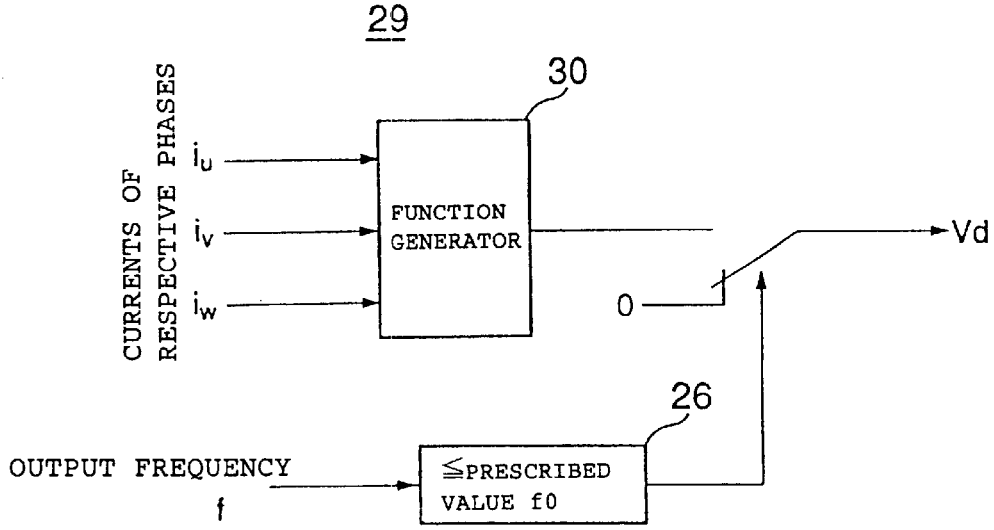
FIG. 11 is an illustrative diagram of a further embodiment of a DC offset generator.

FIG. 10 shows yet a further embodiment of the present invention. The difference between this embodiment and the embodiment shown in FIG. 3 described previously is that the DC offset generator 29 inputs the voltage reference output frequency f and the currents of the respective phases, iu, iv, iw. FIG. 11 gives an illustration of the aforementioned DC offset generator 29, in which the respective phase currents iu, iv, iw are input separately to a function generator 30. This function generator 30 selects the phase current iu, iv, iw having the highest absolute value, and determines a DC offset voltage in accordance with the value and polarity thereof.

Figure 7:
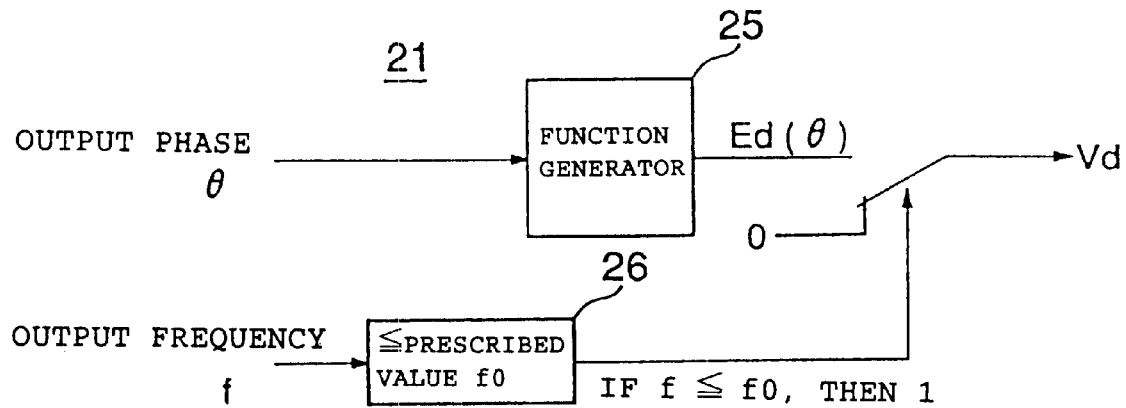
FIG. 7A and FIG. 7B show an illustrative diagram and explanatory diagram of a DC offset generator used in the present invention.
Figure 7:
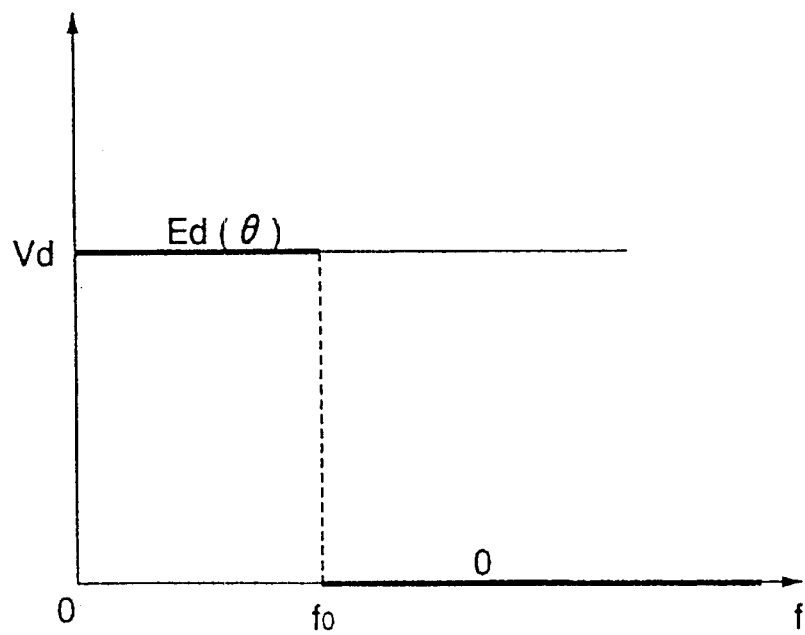
Figure 9:
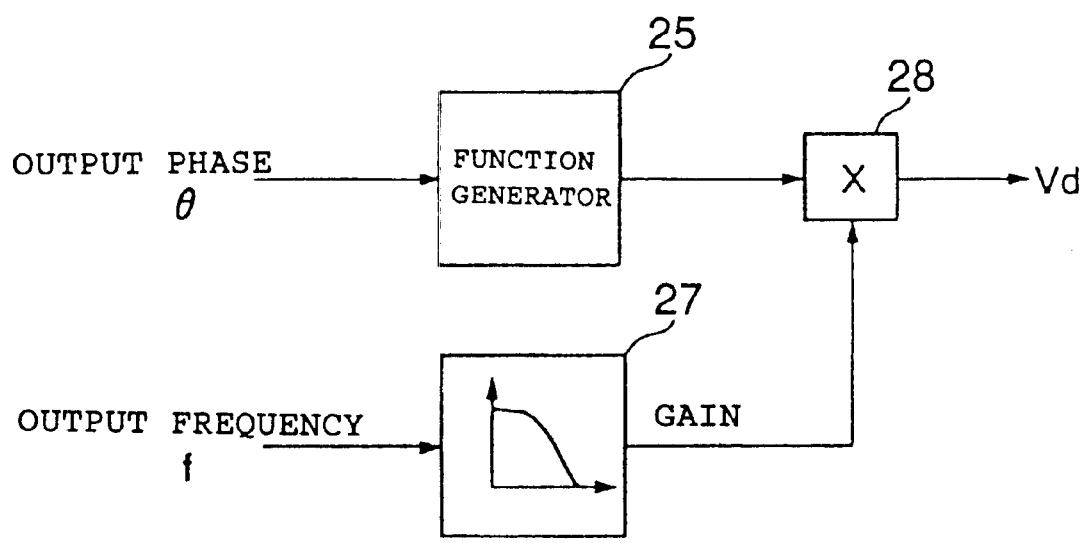
FIG. 9A and 9B shows an illustrative diagram and characteristics graph of a further embodiment of a DC offset generator used in the present invention.
Figure 9:
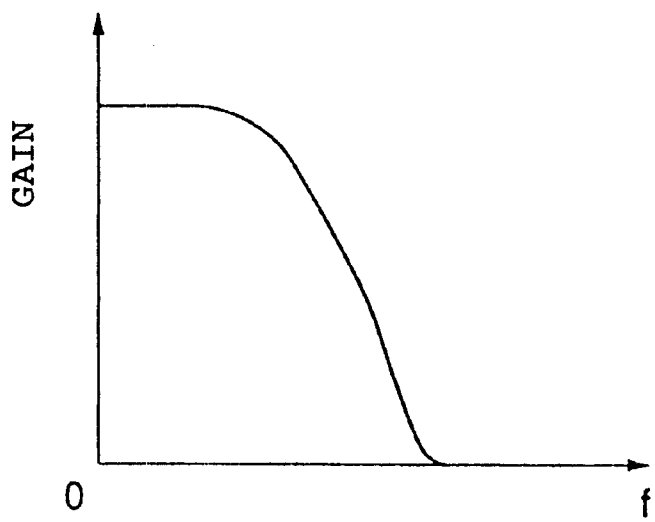

In this embodiment, similarly to FIG. 7 described above, a method of switching according to the voltage reference frequency f is adopted, but it is also possible to adopt a method of diminishing the DC offset voltage in accordance with the voltage reference frequency f, as in the embodiment illustrated in FIG. 9.

If the three-phase current is balanced, then iu+iv+iw=0, and therefore, if two of the currents of the respective phases, for example, currents iu and iw are input, then the current of the remaining phase iv can be calculated from the other two currents (namely, current iv=−iu−iw), and hence in this case, it is possible to input the currents of two phases only. According to this embodiment also, a merit is obtained in that the loss of the power semiconductor elements can be reduced.

Figure 12:
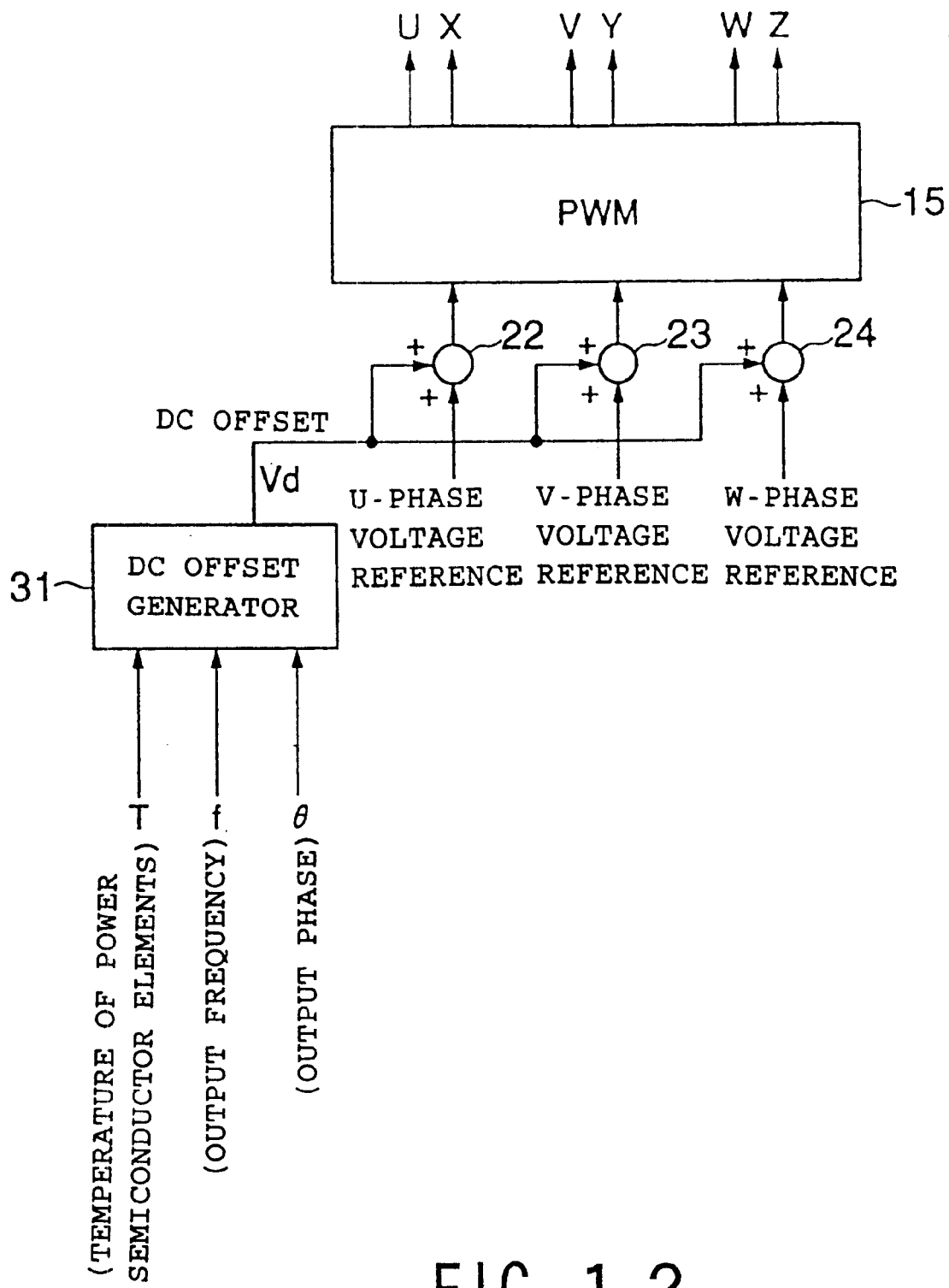
FIG. 12 is a compositional diagram of a further embodiment of the present invention.
Figure 13:
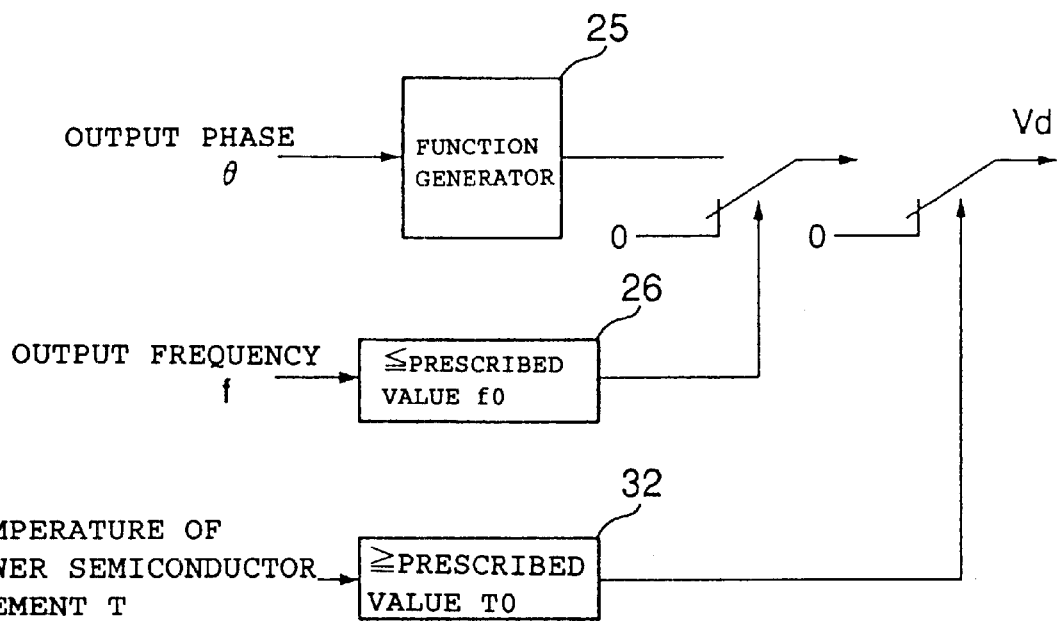
FIG. 13 is an illustrative diagram of yet a further embodiment of a DC offset generator.

FIG. 12 shows a further embodiment of the present invention. In this embodiment, a DC offset generator 31 inputs the output phase θ, the frequency f of the voltage reference, and the temperature T of the power semiconductor elements. The DC offset generator 31 generates a DC offset voltage Vd when the temperature T of the power semiconductor elements is at or above a prescribed value T0, as illustrated in FIG. 13.

In this embodiment, a switch which depends on the temperature T of the power semiconductor elements is added, and this may also be applied similarly to FIG. 9, and the like. According to this embodiment, a merit is obtained in that the loss of the power semiconductor elements can be reduced.

Figure 14:
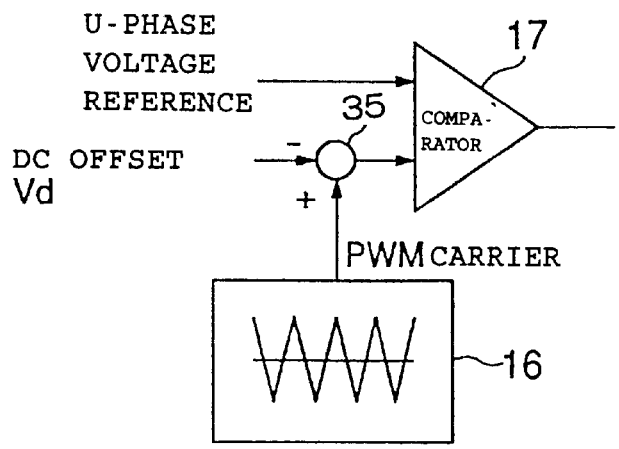
FIG. 14 is an illustrative diagram of yet a further embodiment of a DC offset generator.

FIG. 14 shows yet a further embodiment of the present invention. In this embodiment, instead of adding a DC offset voltage Vd to the voltage references, the DC offset voltage Vd is effectively applied to the voltage references by adding it in inverse polarity to the output of a PWM carrier signal generator 16, by means of an adder 35, the output of which is then compared with the voltage reference signals by a PWM comparator 17 to generate an IGBT signal. In this embodiment also, a merit is obtained in that the loss of the power semiconductor elements can be reduced.

The foregoing embodiments related to three-phase AC, but may also be applied similarly to alternating current other than three-phase, such as single-phase AC, or the like.

As described above, according to the present invention, it is possible to ease the concentration of loss in a particular power semiconductor element in the case of DC operation or low-frequency AC operation, and hence the capacity of power semiconductor elements can be utilized satisfactorily. In other words, it is possible to expand the operating current of the elements whilst using the same cooling device for cooling the elements, or alternatively, it is possible to reduce the cooling device whilst maintaining the same operating current.

Obviously, numerous additional modifications and variations of the present invention are possible in light of the above teachings. It is therefore to be understood that within the scope of the appended claims, the present invention may be practiced otherwise than as specially described herein.

What is claimed is:

1. A control device for a power converter comprising:
   a power converter consisting of power semiconductor elements for converting DC voltage to AC voltage, or AC voltage to DC voltage, by means of pulse width modulation;
   a control device for controlling said power converter; and
   an offset voltage section for adding a DC offset voltage to AC voltage references input to said control device, when a frequency of said AC voltage references is at or below a prescribed value.

2. The control device for a power converter according to claim 1,
   wherein said offset voltage section adds a DC offset voltage of same quantity to all phases of said AC voltage references.

3. The control device for a power converter according to claim 1,
   wherein said offset voltage section diminishes a DC offset voltage added to said AC voltage references, as a frequency of said AC voltage references increases.

4. The control device for a power converter according to claim 1,
   wherein said offset voltage section determines said DC offset voltage in accordance with a frequency of said AC voltage references and an output current.

5. The control device for a power converter according to claim 1,
   wherein said offset voltage section detects a temperature of said power semiconductor elements and adds a DC offset voltage to said AC voltage references if detected temperature exceeds a prescribed value.

6. The control device for a power converter according to claim 1,
   wherein said offset voltage section applies a DC component obtained by adding a pulse width modulation signal and a DC offset voltage in inverse polarity, to said AC voltage references.

7. The control device for a power converter according to claim 2,
   wherein said offset voltage section detects a temperature of said power semiconductor elements and adds a DC offset voltage to said AC voltage references if detected temperature exceeds a prescribed value.

* * * * *